(12) United States Patent
Saunders et al.

(10) Patent No.: US 8,408,424 B2
(45) Date of Patent: Apr. 2, 2013

(54) ACTIVE HOPPER FOR PROMOTING FLOW OF BULK GRANULAR OR POWDERED SOLIDS

(75) Inventors: Timothy Saunders, Canoga Park, CA (US); John D. Brady, Canoga Park, CA (US)

(73) Assignee: Pratt & Whitney Rocketdyne, Inc., Canoga Park, CA (US)

( * ) Notice: Subject to any disclaimer, the term of this patent is extended or adjusted under 35 U.S.C. 154(b) by 634 days.

(21) Appl. No.: 12/618,040

(22) Filed: Nov. 13, 2009

(65) Prior Publication Data

US 2011/0114662 A1    May 19, 2011

(51) Int. Cl.
*B65D 83/00*    (2006.01)
(52) U.S. Cl. .................. 222/196; 222/226; 222/185.1
(58) Field of Classification Search .......... 222/196–201, 222/180, 181.1–181.3, 185, 186, 216–218, 222/243, 244, 248, 234, 226; 52/192–197
See application file for complete search history.

(56) References Cited

U.S. PATENT DOCUMENTS

| | | | |
|---|---|---|---|
| 1,324,930 A | 12/1919 | Schaffer | |
| 1,942,581 A * | 1/1934 | Tolman, Jr. | 222/200 |
| 2,174,348 A | 9/1939 | Damond | |
| 3,173,583 A | 3/1965 | Wahl | |
| 3,232,486 A | 2/1966 | Ofner | |
| 3,773,231 A | 11/1973 | Wahl | |
| 3,853,247 A | 12/1974 | Wahl | |
| 4,319,995 A | 3/1982 | Haight | |
| 4,346,802 A * | 8/1982 | Popper | 198/533 |
| 4,545,569 A | 10/1985 | Schroder et al. | |
| 5,405,049 A | 4/1995 | Ricciardi | |
| 5,413,254 A | 5/1995 | Decker et al. | |
| 5,423,455 A | 6/1995 | Ricciardi et al. | |
| 5,472,117 A | 12/1995 | Geiser et al. | |
| 5,533,650 A | 7/1996 | Conrad et al. | |
| 5,875,935 A * | 3/1999 | Koch et al. | 222/200 |
| 6,065,650 A * | 5/2000 | Horton et al. | 222/196 |
| 6,311,438 B1 | 11/2001 | Haquette | |
| 2009/0114665 A1 | 5/2009 | Ogawa et al. | |

FOREIGN PATENT DOCUMENTS

| | | |
|---|---|---|
| JP | 02019294 | 1/1990 |
| JP | 2007112619 | 5/2007 |
| KR | 2003-0008718 | 1/2003 |
| WO | 2007076016 | 7/2007 |

OTHER PUBLICATIONS

International Search Report and Written Opinion Mailed Jul. 8, 2011. International Application No. PCT/US2010/056498 Notification Concerning Transmittal of International Preliminary Report on Patentability.

* cited by examiner

*Primary Examiner* — Lien Ngo
(74) *Attorney, Agent, or Firm* — Carlson, Gaskey & Olds

(57) ABSTRACT

An apparatus that promotes the flow of materials has a body having an inner shape for holding the materials, a wall having a shape that approximates a portion of the inner shape of the body, and a vibrator attached to the wall. The wall may be disposed vertically within the body close to the body's inner shape. The vibrator transfers vibrations to the wall to agitate the material and encourage material flow.

5 Claims, 1 Drawing Sheet

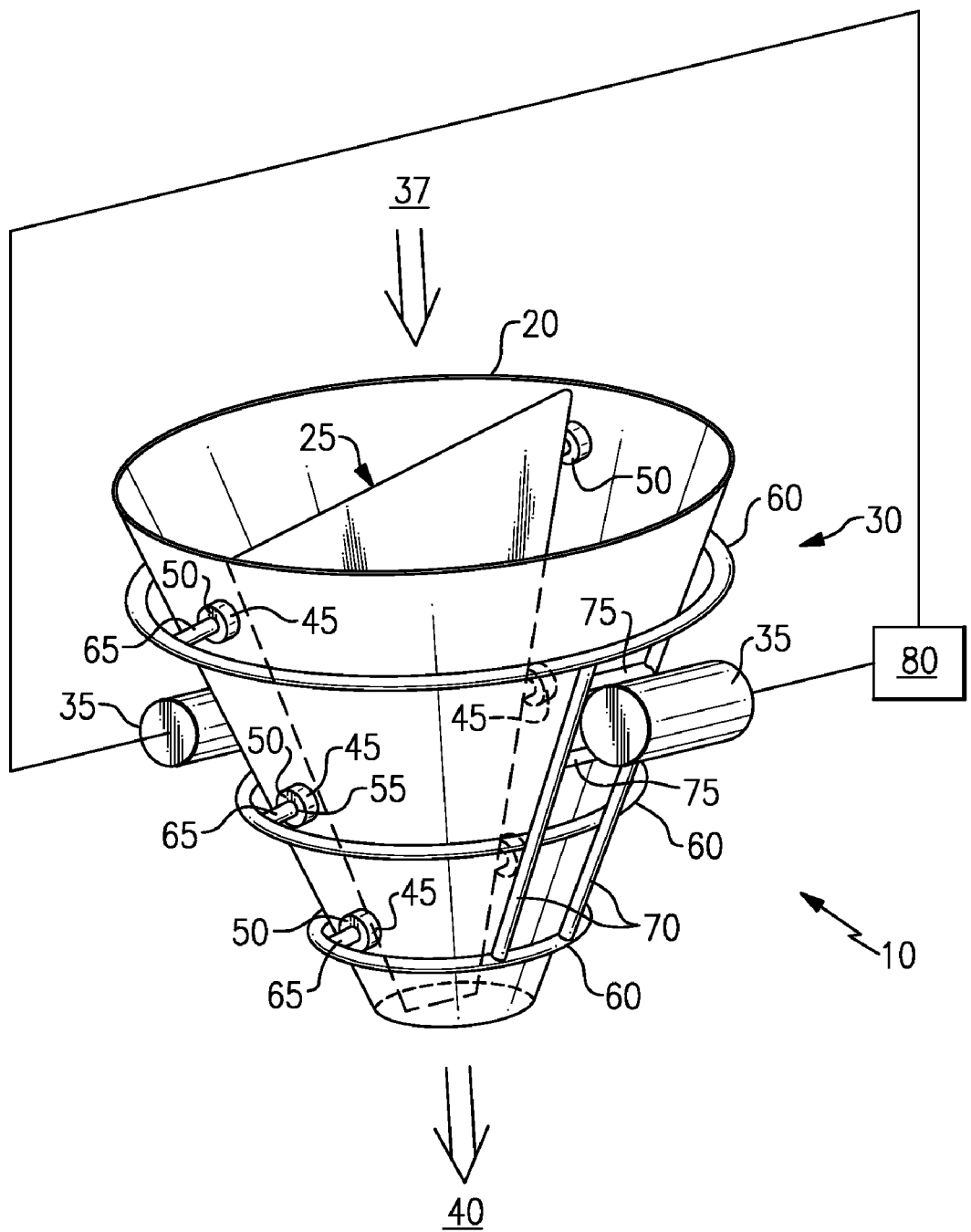

ACTIVE HOPPER FOR PROMOTING FLOW OF BULK GRANULAR OR POWDERED SOLIDS

STATEMENT OF GOVERNMENT RIGHTS

The subject matter described herein was conceived in the performance of work under U.S. Department of Energy Contract No. DE-FC26-04NT42237. The U.S. Government may have certain rights related to this document.

BACKGROUND

The communication of powdered, granular, pulverized, or other such material may be complicated by the tendency of such material to stick to portions of a hopper.

Apparatus that induce the flow of material from hoppers include external vibrating devices, internal pulsating air pads that line the hopper walls, mechanically driven rotating agitators, and the like. Rotating agitators generally are impractical on hoppers of relatively large size because moving large masses of powder or granular material may be difficult. Also, while the vibration of the hopper serves to promote the discharge of some materials, vibration may not be effective for materials of a sticky character. Further, hopper rigidity and structural mass may limit the vibration that can be transmitted through the hopper walls and into and through the material contained therein.

BRIEF DESCRIPTION OF THE DRAWING

FIG. 1 is a perspective view of a non-limiting embodiment of a vibratory hopper.

DETAILED DESCRIPTION

Referring to the drawing, the vibratory hopper 10 generally includes a hopper 20, a wall 25 disposed within the hopper, a frame 30 surrounding the hopper, and vibrators 35 that attach to the frame 30.

The hopper 20 has a frusto-conical shape, with an inlet 37 to receive raw material (not shown) such as coal or other solid feedstock and an outlet 40 for directing the raw material typically to a conveyor (not shown) The hopper 20 may have other shapes, including but not limited to, rectangular, square, conical, etc. The hopper in one non-limiting embodiment has six holes 45 therein; three on each side of a diameter of the hopper 20. Each hole 45 has a dampener 50. The dampener may be a bushing which at least partially dampens vibration, shock and other forces. The dampener may provide for vibrational insulation. Each dampener 50 has an opening 55 for receiving a portion of the frame 30 as will be discussed hereinbelow. The dampener 50 minimizes vibrations that might reach the hopper 20.

The frame 30, which distributes vibration to the wall 25 there through, is disposed outside the hopper 20 and has three rigid portions 60 disposed generally horizontally and generally in parallel to each other, each portion 60 in close proximity to and approximating the outer shape of the hopper 20 along its height. Each portion has a pair of struts 65 that depend inwardly through a dampener 50 and attach fixedly to a periphery of the wall 25. The frame may be disposed symmetrically about the hopper 20 in conformance to an outer shape thereof.

The isolation bushing absorbs certain energy thereby reducing the magnitude of vibration that is transmitted to the hopper, which if unchecked creates compaction and consideration of material in the hopper and restricts or prevents flow out of the hopper. The frame supports the wall 25. The frame is shown herein as circumscribing the hopper and has parallel parts horizontally and vertically disposed, but other support structures are contemplated herein if those structures provide vibrations to the wall 25 while supporting and providing that vibrations are applied equally to the wall 25 without affecting the hopper 20.

In the non-limiting embodiment shown herein, the portions 60 appear as concentric rings of differing diameters though the portions may form other shapes and relationships depending on the shape of a desired hopper.

The portions 60 are attached to each other by two pairs of vertically extending rods 70. The rods are attached to each other by a pair of horizontally extending pieces 75 on which the vibrators 30 are mounted. The portions 60, struts 65, rods 70, pieces 75 and the wall 25 are all made of a stiff material, such as steel, that will transmit vibrations and receive vibrations and have a long life given their environment.

Rotary vibrators 35 have an eccentrically mounted weight (not shown), driven by a motor (not shown), to impart vibration to the pieces 75 that hold the rotary vibrators 35, to the rods 70 joining the portions 60, to the portions 60, to the struts 65, and to the wall 25. The vibrators are shown and described herein as being mounted on the pieces 75 but may be placed on other parts of the frame 30 if the placement provides vibrations equally to the wall 25 without affecting the hopper 20.

The rotary vibrators 35 are controlled by a controller 80, that imparts a vibratory pattern to each rotary vibrator 35 so that any granular or powdered material in the hopper 20 may be unbound, unbridged or unstuck so it flows uniformly from the inlet 37 to the outlet 40 of the hopper 20. Each rotary vibrator 35 provides a similar vibratory output to the frame 30 to avoid creating waves that could damage the frame 30, the hopper 20 or the wall 25. Two vibrators 35 are provided at opposite sides of the hopper 20 to prevent asymmetries that would unbalance the frame and provide harmful stresses to the frame 30, wall 25 and hopper 20.

The wall 25 has a truncated triangular shape that geometrically resembles the interior of the hopper 20. The wall 25 bisects or forms a chord in the chamber to minimize a possibility that any particle bridges or the like will form across the hopper 20 and inhibit flow there through. If an end attaching to the wall 25 of any raw material bridge is destroyed by vibration of the wall 25, the bridge fails and material flows through the outlet 40. The wall 25 is formed of a flat plate as shown but may take other planar and non-planar shapes such as corrugations, meshes, attached lattices or perforations as may be chosen for a particular material to be moved through the hopper 20. Similarly bisection of the hopper 20 by the wall 25 is not critical and may take other similar positions within the hopper.

During operation, vibrators 35 are activated and impart vibration to the pieces 75 that hold the rotary vibrators 35, to the rods 70 joining the portions 60, to the portions 60, to the struts 65, and to the wall 25. The wall 25 vibrates thereby imparting vibration to the material in a relatively large area of the hopper 20 so that any granular or powdered material in the hopper 20 may be unbound, unbridged or unstuck thereby allowing material to flow more uniformly from the inlet 37 to the outlet 40 of the hopper 20. The isolating dampener 50 does not transmit significant vibration from the struts 65 passing through the isolating dampener 50 to the hopper 20 thereby extending the life of the hopper 20.

Although a preferred embodiment has been disclosed, a worker of ordinary skill in this art would recognize that certain modifications would come within the scope of this invention. For that reason, the following claims should be studied to determine the true scope and content of this invention.

What is claimed is:

1. An apparatus for promoting bulk material flow, said apparatus comprising:
    a hopper;
    a plate located within said hopper;
    a vibrator communicating with said plate, wherein said vibrator is located exterior to said hopper and wherein said hopper is vibrationally insulated from said vibrator;
    a frame disposed exterior of said hopper, said frame having said vibrator mounted thereupon; and
    a strut passing from said frame through said hopper to said plate wherein a dampener is disposed between said strut and said hopper said strut passing vibration of said vibrator to said plate, said dampener minimizing vibration to the hopper.

2. The apparatus of claim 1 wherein said strut attaches to a peripheral edge of said plate transferring vibration therethrough and supporting said plate.

3. The apparatus of claim 1 wherein said frame does not touch said hopper.

4. The apparatus of claim 1 wherein said frame encircles said hopper.

5. the apparatus of claim 4 wherein said frame includes a second vibrator mounted thereon.

* * * * *